United States Patent
Estes

(10) Patent No.: US 8,036,993 B2
(45) Date of Patent: Oct. 11, 2011

(54) SYSTEMS AND METHODS FOR REDIRECTING ITEMS IN A DELIVERY SYSTEM

(75) Inventor: Jacquelynn Estes, Warrenton, VA (US)

(73) Assignee: United States Postal Service, Washington, DC (US)

( * ) Notice: Subject to any disclaimer, the term of this patent is extended or adjusted under 35 U.S.C. 154(b) by 1425 days.

(21) Appl. No.: 10/363,535

(22) PCT Filed: Sep. 6, 2001

(86) PCT No.: PCT/US01/27563
§ 371 (c)(1), (2), (4) Date: Mar. 5, 2003

(87) PCT Pub. No.: WO02/21421
PCT Pub. Date: Mar. 14, 2002

(65) Prior Publication Data
US 2003/0208372 A1 Nov. 6, 2003

Related U.S. Application Data

(60) Provisional application No. 60/231,308, filed on Sep. 8, 2000.

(51) Int. Cl.
G06Q 30/00 (2006.01)
(52) U.S. Cl. ......................... 705/338; 705/337
(58) Field of Classification Search .......... None
See application file for complete search history.

(56) References Cited

U.S. PATENT DOCUMENTS

| | | | |
|---|---|---|---|
| 5,025,386 A | | 6/1991 | Pusic |
| 5,076,879 A | * | 12/1991 | Svyatsky ................ 156/361 |
| 5,422,821 A | | 6/1995 | Allen et al. |
| 5,703,783 A | | 12/1997 | Allen et al. |
| 5,836,138 A | * | 11/1998 | Hendriks .................. 53/206 |
| 5,936,865 A | * | 8/1999 | Pintsov et al. ............. 700/107 |
| 6,690,773 B1 | * | 2/2004 | Law ........................ 379/88.22 |
| 6,691,156 B1 | * | 2/2004 | Drummond et al. ....... 709/206 |
| 6,741,724 B1 | * | 5/2004 | Bruce et al. ............... 382/101 |
| 7,130,803 B1 | * | 10/2006 | Couch et al. ............... 705/1 |
| 2001/0049745 A1 | * | 12/2001 | Schoeffler ................ 709/238 |
| 2004/0211834 A1 | * | 10/2004 | Fleckenstein et al. ..... 235/385 |
| 2006/0229934 A1 | * | 10/2006 | Law .......................... 705/10 |
| 2008/0133261 A1 | * | 6/2008 | Ray ............................. 705/1 |
| 2009/0138730 A1 | * | 5/2009 | Cook et al. ............... 713/193 |
| 2010/0306332 A1 | * | 12/2010 | Law ........................... 709/206 |

* cited by examiner

*Primary Examiner* — Mussa Shaawat
(74) *Attorney, Agent, or Firm* — Finnegan, Henderson, Farabow, Garrett & Dunner LLP

(57) ABSTRACT

In the redirection process, items (110a-110n) are sent through a delivery system (130) directed to a recipient (155) at a first address (150) served by a first address plant (140). The recipient (155), however, no longer desires to have items (110a-110n) delivered to the first address (150) served by the first address plant (140), but now desires to have items delivered to an alternative address (160). Items are collected at the first address plant (140) and are held for a period of time specified by the recipient (155). Once this period of time for holding and collecting has expired, the items (110a-110n) are placed in a package (115). This package (115) is then sent through the delivery system (130) to an alternative address plant (145). Once the package (115) is received at the alternative address plant (145), the package (115) is delivered to the recipient (155) at the alternative address (160).

21 Claims, 3 Drawing Sheets

SYSTEMS AND METHODS FOR REDIRECTING ITEMS IN A DELIVERY SYSTEM

RELATED APPLICATION

Under provisions of 35 U.S.C. §119(e), the Applicant claims the benefit of U.S. provisional application No. 60/231,308, filed Sep. 8, 2000, which is incorporated herein by reference.

DESCRIPTION OF THE INVENTION

1. Technical Field

The present invention relates generally to a system and method for redirecting items in a delivery system. More particularly, the present invention provides for packaging collected items bound for a first address and sending the package to an alternative address.

2. Background

The need to redirect items in a delivery system has become a common need for many individuals and organizations. More specifically, providing a service that moves away from addresses as physical locations and instead gives recipients first addresses and allows the delivery system operator to redirect items to alternate addresses has become a critical service for many delivery system operators. This is due to the fact that an increasing number of recipients locate at a first address and then relocate to many different locations within a specific period of time.

Examples of recipients who can benefit from an item redirection service may include recipients who locate on a seasonal basis, recipients in resort areas, college students who relocate from home to school on a structured scheduled basis, and recipients who move or travel frequently in the course of their employment. These recipients have in common the need to change their physical address, but do not want the inconvenience of consistent recurrent permanent changes in address. These recipients need a service that allows them to keep one address of which senders are aware, yet have items that were sent to the one address in the delivery system follow them as the recipient's physical address changes. Accordingly, redirecting items in a delivery system remains an elusive goal.

One solution to the item redirection problem is for the recipient to register a new physical address of the recipient with the delivery system operator and have all items forwarded to the new physical address. In this case, when a recipient moves and wishes to have items sent to a new address, the recipient notifies the delivery system operator of the new physical address. Once the delivery system operator is notified of the new address, all items sent to the old address are detected by the delivery system, relabeled, and then forwarded to the new address. In the aforementioned forwarding service, however, items are forwarded only for a specific period of time. The delivery system operator expects the recipient to contact each and every sender from whom the recipient may expect to receive an item and notify the possible senders of the recipient's address change. After the forwarding time period has expired, the delivery system operator will cease forwarding items to the recipient and will return to the sender all items sent to the recipient's old address. If the recipient relocates multiple times within a short period of time, the laborious task of contacting each and every sender from whom the recipient may expect to receive an item must be repeated for each relocation event.

Thus, there remains a need for a service that moves away from addresses as physical locations and instead gives recipients first addresses and allows the delivery system operator to redirect items to alternate addresses which may comprise current physical locations of recipients. In addition, there remains a need for a service that does not require for each relocation event, contacting each and every sender from whom the recipient may expect to receive an item.

SUMMARY OF THE INVENTION

In accordance with the current invention, an item redirection method and system are provided that avoid the problems associated with prior art redirection methods and systems as discussed herein above.

In one aspect, a method for providing an item redirection service consistent with the invention includes registering a recipient for the item redirection service, processing items addressed to the recipient at a first address, placing the items in a package addressed to the recipient at an alternate address, and sending the package to the alternate address.

In another aspect, a system for providing an item redirection service for a recipient having a first address and an alternate address comprises a delivery system configured to deliver items addressed to the recipient, a first address plant contained within the delivery system and associated with the first address, an alternate address plant contained within the delivery system and associated with the alternate address, and a processor at a first address plant for processing items addressed to the recipient at the first address, packaging the items, and sending the package to the recipient at the alternate address via the alternate address plant.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
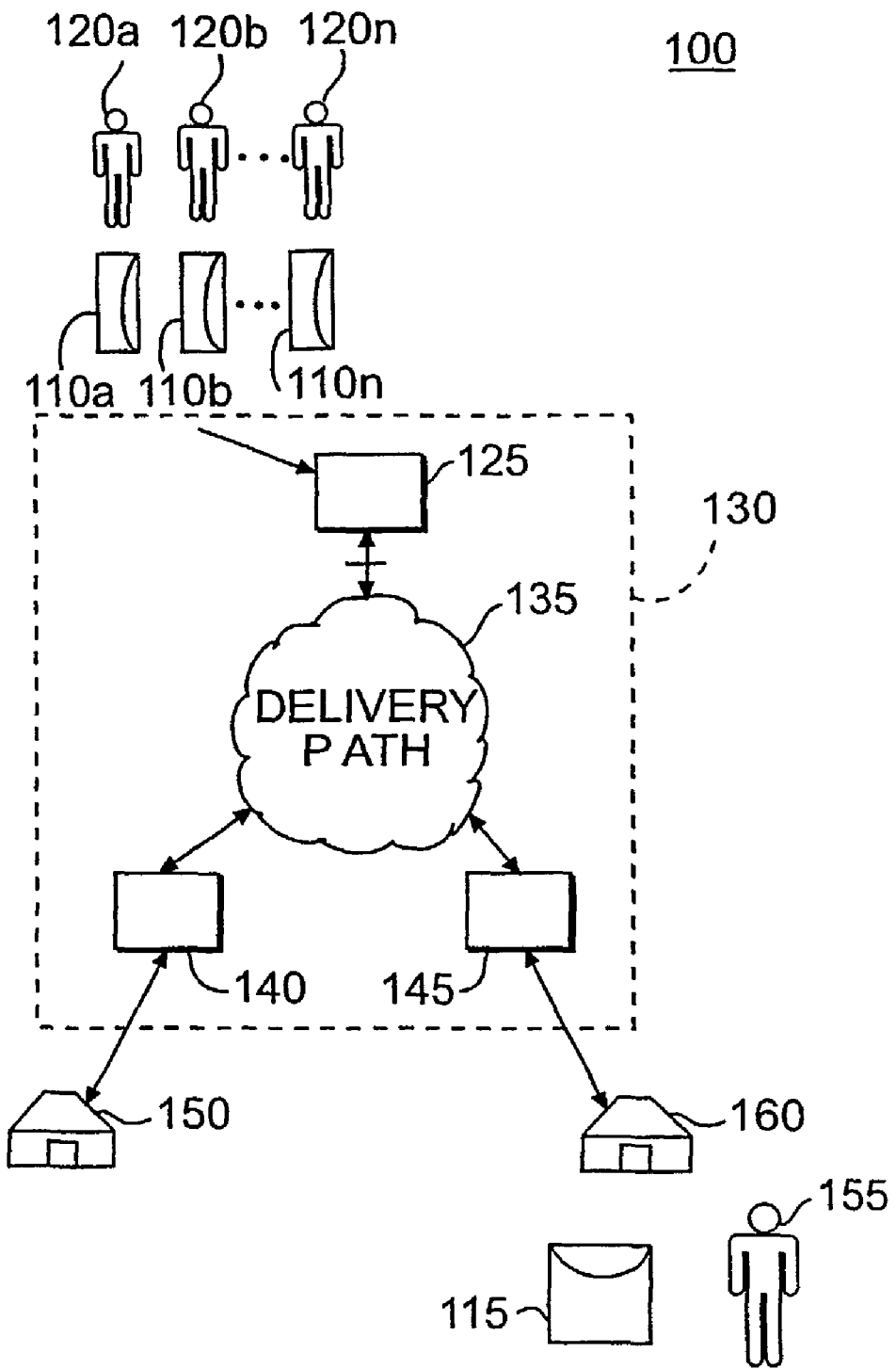
FIG. 1 is a functional block diagram of a system for redirecting items in a delivery system consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

FIG. 1 shows an item redirection system 100. Item redirection system 100 provides for a plurality of senders, for example, 120a through 120n, placing items 110a through 110n into a delivery system 130. Items 110a through 110n will be referred to collectively as items 110 and senders 120a through 120n will be referred to collectively as senders 120 hereinafter. Items 110 contain address labels indicating a first address 150 of a recipient 155 and are routed through delivery system 130. Delivery system 130 comprises a sender plant 125, a delivery path 135, a first address plant 140 and an alternative address plant 145. Delivery path 135 comprises a plurality of plants similar to sender plant 125, first address plant 140 and alternative address plant 145. The plants within delivery path 135 contain, among other things, automated systems and sorting equipment and are designed to receive and process a plurality of items. Delivery system 130 is configured to sense tracking indicia placed on items 110 as they pass through the elements of delivery system 130 directing the movement of items 110 through delivery system 130.

In the redirection process, items 110 are sent through delivery system 130 by senders 120 to first address plant 140. Recipient 155, however, no longer desires to have items 110 delivered to first address 150 and now desires to have items 110 delivered to alternative address 160. In response to this, items 110 are collected at first address plant 140 and are held for a period of time. This period of time was specified by recipient 155 when recipient 155 registered for item redirection service with the delivery system operator. Once this period of time expires, items 110 are placed in a package 115. Package 115 is then sent from first address plant 140, through delivery system 130, to alternative address plant 145. Once package 115 is received at alternative address plant 145, package 115 is delivered to recipient 155 at alternative address 160. Thus collected items 110 bound for first address 150 are packaged and sent to an alternative address 160.

Figure 2:
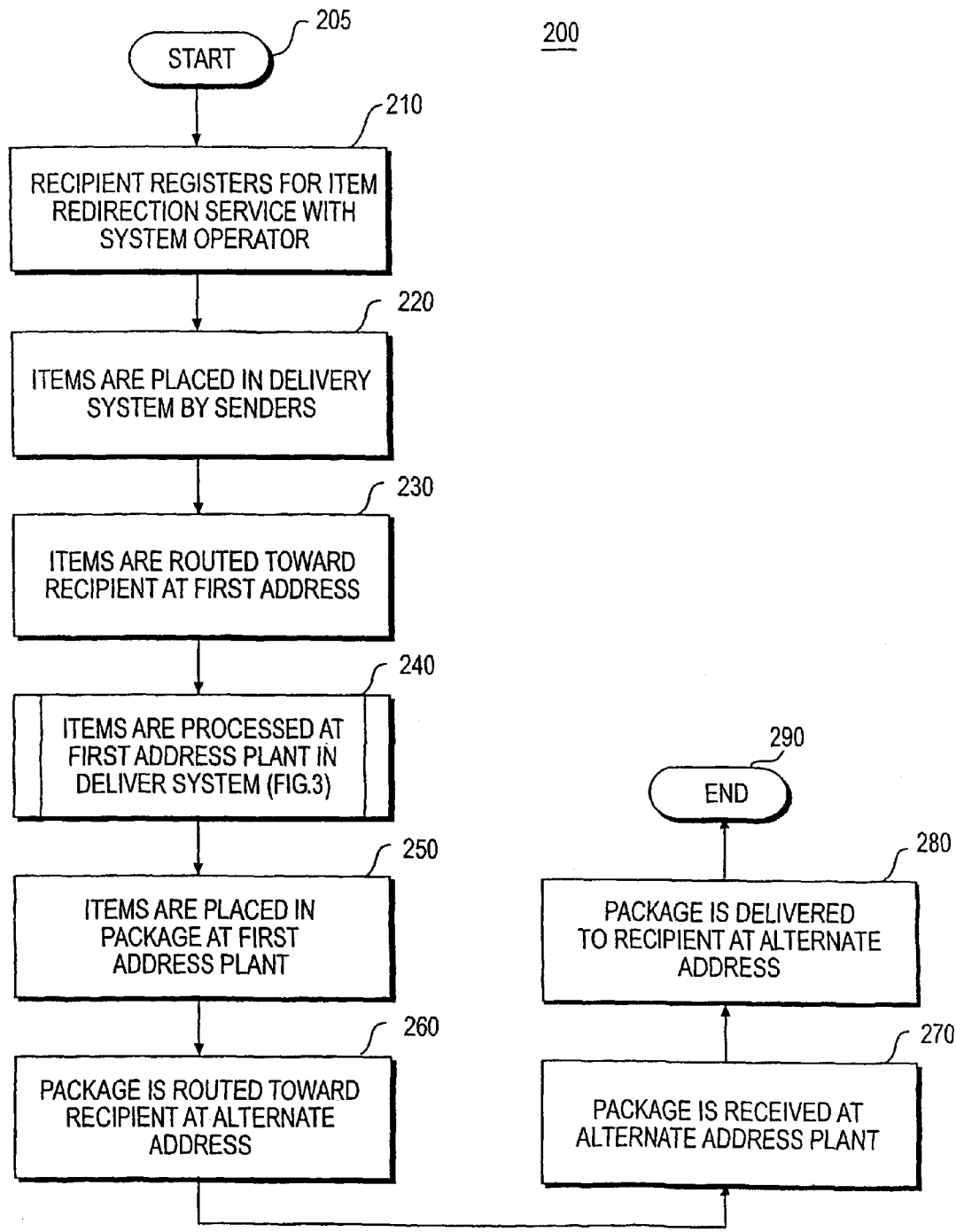
FIG. 2 is a flow chart of a method for redirecting items in a delivery system consistent with the present invention.

FIG. 2 is a flow chart setting forth the general stages involved in an exemplary method 200 for packaging collected items 110 bound for first address 150 and sending package, 115 containing items 110 to alternative address 160. The implementation of a subroutine of method 200 in accordance with an exemplary embodiment of the present invention will be described in greater detail in FIG. 3.

Exemplary method 200 begins at starting block 205 and proceeds to stage 210 where recipient 155 registers for item redirection service with delivery system operator. At this point, recipient 155 registers for item redirection service by completing an application with the system operator. The system operator processes the application along with any payment information and delivery instructions. Delivery instructions may include information such as where recipient 155 wants items 110 redirected and with what frequency recipient 155 wants items 110 redirected. Registering for item redirection service may be performed using, for example, regular mail, e-mail, facsimile, the internet, or an interactive voice response system. An interactive voice response system (IVR) is an automated telephone answering system that responds with a voice menu and allows the recipient 155 to make choices and enter information via the telephone keypad. IVR systems are widely used in call centers as well as a replacement for human switchboard operators. Database access and fax response may also be implemented in delivery instructions submission. Those skilled in the art, however, will appreciate that many other ways exist for registering for item redirection service with the delivery system operator.

For example, recipient 155 living at first address 150 in one part of the country may wish to live at alternative address 160 in another portion of the country for a brief period of time. While living at alternative address 160, recipient 155 desires to have items 110, delivered to alternative address 160 on Tuesdays and Thursdays for the months of January and February. Items 110, however, are addressed to first address 150. In this case, recipient 155 registers for item redirection service by notifying the delivery system operator of alternative address 160, the aforementioned period of time the item redirection service is to be performed, the aforementioned frequency of delivery to alternative address 160, and payment information. Payment information may include a credit card number, a checking account number to draft, or an address to send a bill. Those skilled in the art, however, will appreciate that other types of payment information may be used. Billing for the service may be triggered when recipient 155 registers for item redirection service, when items 110 are collected at alternative address plant 140, when package 115 is delivered to alternative address 160, or at anytime after package 115 is received by recipient 155.

Once recipient 155 registers for item redirection service with the delivery system operator in stage 210, exemplary method 200 continues to stage 220 where items 110 are placed in delivery system 130 by senders 120. FIG. 1 shows the plurality of senders 120 placing items 110 into delivery system 130 at sender plant 125. However, items 110 may be placed in sender plant 125, any other plant of delivery system 130, or any combination of plants within delivery system 130. Items 110 delivered through delivery system 130 may include letters or other mailpieces, however, those skilled in the art will appreciate that many other types of items 110 may be delivery through delivery system 130.

Delivery system 130 comprises sender plant 125, delivery path 135, first address plant 140 and alternative address plant 145. Delivery path 135 comprises a plurality of plants similar to sender plant 125, first address plant 140 and alternative address plant 145. The plants within delivery system 130 may contain, among other things, automated systems and sorting equipment located at a plurality of locations. In executing their function, the plants comprising delivery system 130 process items 110 received by checking the delivery address entered on a particular item of items 110.

The particular items of items 110 are routed to the next most appropriate plant for the particular items in delivery system 130. The appropriateness of the next plant in delivery system 130 depends upon the present location of the particular item in delivery system 130 and where the particular item is addressed. Ultimately, the particular items are routed in delivery system 135 to the plant that serves the delivery address indicated on the particular item of items 110, according to established procedures. Thus items 110 are routed from plant to plant within delivery system 130 wherein items 110 efficiently converge on the plant that serves the delivery address indicated on the item. Throughout this process, delivery system 130 tracks the progress of items 110 through delivery system 130.

From stage 220 where items 110 are placed in delivery system 130 by senders 120, exemplary method 200 continues to stage 230 where items 110 are routed toward recipient 155 at first address 150. Items 110 are marked by senders 120 with recipient's first address 150, which was the recipient's delivery address prior to requesting item redirection service. Routing items 110 toward recipient 155 at first address 150 comprises sending items 110 from plant to plant within delivery system 130 wherein items 110 efficiently converge on first address plant 140. First address plant 140 is the plant within delivery system 130 that serves the delivery address labeled on items 110. Throughout this process, delivery system 130 may track the progress of items 110 through delivery system 130 using, for example, tracking indicia placed on items 110 at sender plant 125.

Figure 3:
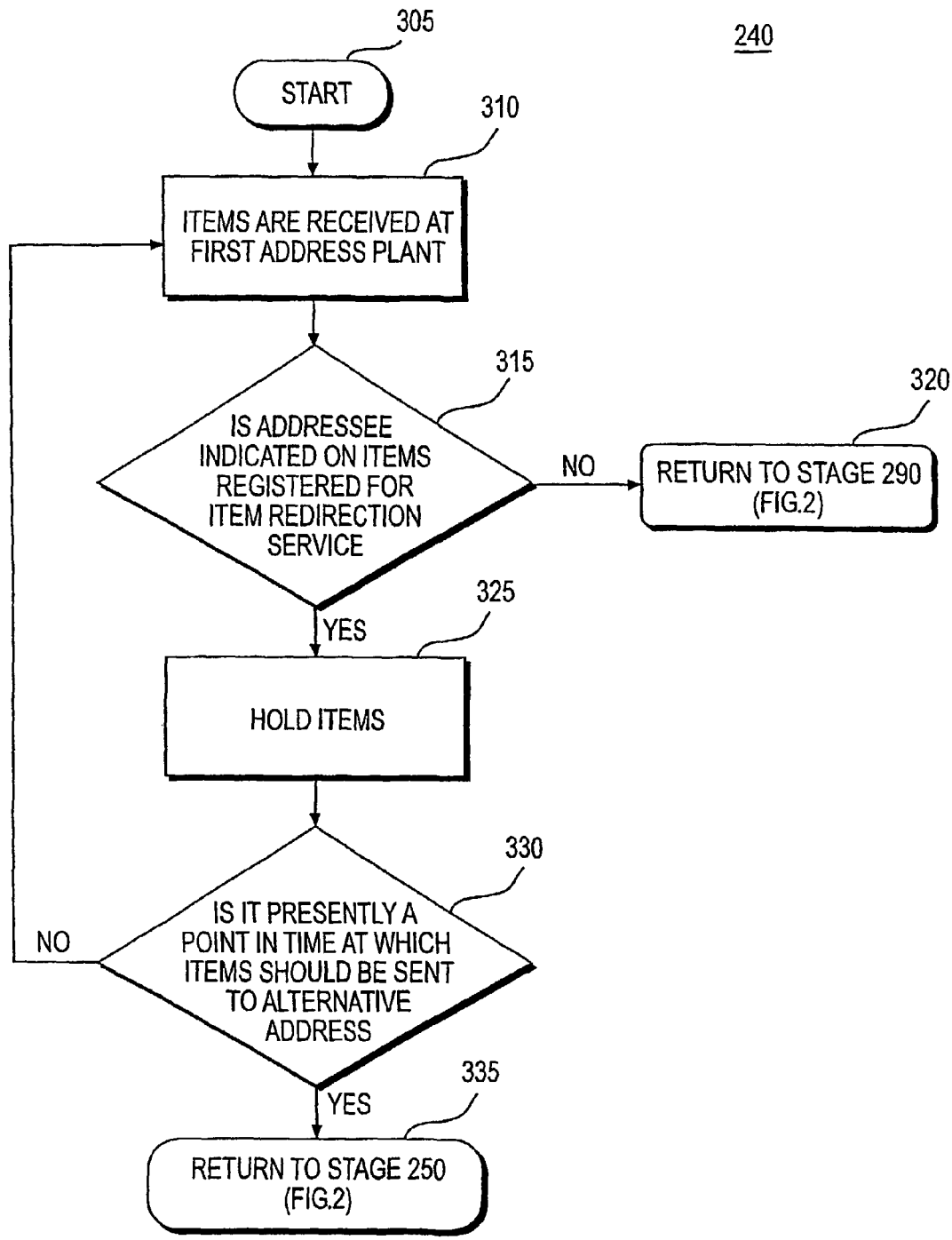
FIG. 3 is a flow chart of a subroutine used in the method of FIG. 2 for processing items at a first address plant in the delivery system.

After items 110 are routed toward recipient 155 at first address 150 in stage 230, exemplary method 200 proceeds to subroutine 240 where items 110 are processed at first address plant 140 in delivery system 130. The stages of subroutine 240 are shown in FIG. 3 and will be described in greater detail below.

From subroutine 240 where items 110 are processed at first address plant 140 in delivery system 130, exemplary method 200 continues to stage 250 where items 110 are placed in package 115 at first address plant 140. Package 115 is labeled with new address 160 where recipient 155 has requested the redirected items to be sent. Package 115 may comprise a United States Postal Service Priority Mail package, however, those skilled in the art will appreciate that may other types of packages may be employed.

Once items 110 are placed in package 115 at first address plant 140 in stage 250, exemplary method 200 advances to stage 260 where package 115 is routed toward recipient 155 at alternate address 160. This routing comprises routing package 115 from plant to plant within delivery system 130 wherein package 115 efficiently converges on alternative address plant 145. Alternative address plant 145 is the plant within delivery system 130 that serves alternative address 160. Throughout this process, delivery system 130 may track the progress of package 115 through delivery system 130. After package 115 is routed toward recipient 155 at alternate address 160 in stage 260, exemplary method 200 proceeds to stage 270 where package 115 is received at alternate address plant 145. From stage 270 where package 115 is received at alternate address plant 145, exemplary method 200 continues to stage 280 where package 115 is delivered to recipient 155 at alternate address 160. From stage 280, exemplary method 200 ends at stage 290.

Items are Processed at a First Address Plant in the Delivery System

FIG. 3 describes exemplary subroutine 240 from FIG. 2 in which items 110 are processed at first address plant 140 in delivery system 130. Subroutine 240 begins at starting block 305 and advances to stage 310 where items 110 are received at first address plant 140 after being routed from plant to plant within delivery system 130 and wherein efficiently converging at first address plant 140. First address plant 140 is the plant within delivery system 130 that serves first address 150 which is the delivery address labeled on items 110

After items 110 are received at first address plant 140 in stage 310, subroutine 240 continues to decision block 315 where it is determined if addressee indicated on items 110 is registered for item redirection service. Information is gathered by the system operator on which recipients are registered for item redirection service from applications completed by recipients seeking item redirection service. The system operator processes the applications which are completed along with any payment information and delivery instructions. Included in the delivery instructions is information relevant to where recipient 155 wants items 110 redirected and with what frequency recipient 155 wants items 110 redirected. Information regarding which recipients have registered for item redirection service is communicated to the appropriate plants within delivery system 130 and is updated as needed. If the addressee indicated on items 110 is registered for item redirection service, subroutine 240 advances to stage 325 where items 110 are held for recipient 155 at first address plant 140 instead of being delivered to address 150. If at decision block 315, however, it is determined that the addressee indicated on items 110 is not registered for item redirection service, no item redirection service is performed and subroutine 240 advances to stage 320 and returns to stage 290 of FIG. 2.

From stage 325 where items 110 are held for recipient 155, subroutine 240 continues to decision block 330 where it is determined if it is presently a point in time at which items 110 should be sent to alternative address 160. For example, if recipient 155 wishes delivery to alternative address 160 on Tuesdays and Thursdays for the months of January and February, recipient 155 would notify the delivery system operator of alternative address 160 and the aforementioned period of time the item redirection service is to be performed. This notification is performed when recipient 155 registers for item redirection service. From this information, a determination is made as to the point in time at which items 110 should be sent to alternative address 160. If it is not presently a point in time at which items 110 should be sent to alternative address 160, subroutine 240 repeats stage 310 and continues to receive items 110 at first address plant 140. If at decision block 330, however, it is determined that it is presently a point in time at which items 110 should be sent to alternative address 160, subroutine 240 advances to stage 335 and returns to stage 250 of FIG. 2.

In view of the foregoing, it will be appreciated that the present invention provides a system and method for redirecting items in a delivery system. Still, it should be understood that the foregoing relates only to the exemplary embodiments of the present invention, and that numerous changes may be made thereto without departing from the spirit and scope of the invention as defined by the following claims.

I claim:

1. A method for providing an item redirection service, comprising the stages of:

receiving registration information for registering one or more recipients for the item redirection service, the registration information including delivery schedules associated with the recipients and specifying one or more periods during which the recipients desire to redirect items addressed to the recipients to alternate addresses associated with the recipients;

receiving, at a first address plant, an item addressed to a recipient at a first address;

determining, by a computing system, whether the recipient is registered for the item redirection service; and when it is determined that the recipient is registered for the item redirection service:

holding the received item at the first address plant without delivering the item to the recipient at the first address;

determining, by the computing system and based on a delivery schedule associated with the recipient, whether a present time corresponds to a period during which the recipient desires to redirect items to an alternate address associated with the recipient; and when it is determined that the present time corresponds to a time period during which the recipient desires to redirect items to the alternate address:

readdressing the held item to the recipient at the alternate address; and sending the readdressed item to the alternate address;

wherein the items are physical mail pieces, and the first address and the alternate address are physical addresses.

2. The method of claim 1 further comprising the stage of:
receiving payment from the recipient when the item is sent to the recipient at the alternate address by at least one of the following: billing the recipient, debiting recipient's checking account, and debiting recipient's credit card account.

3. The method of claim 1, wherein the is registration information is provided using at least one of the following media:
regular mail, e-mail, facsimile, internet, and an interactive voice response system.

4. The method of claim 1, wherein readdressing includes placing tracking indicia placed on a package containing the item, at the first address plant.

5. The method of claim 1, further comprising sending the item to the recipient at the alternate address via a priority mail service.

6. The method of claim 1, wherein the physical mail pieces include address labels addressed to the recipient at the first address.

7. The method of claim 1, wherein the alternate address is designated by the recipient when the recipient registers for the item redirection service.

8. The method of claim 1, wherein receiving the item further comprises receiving the item from a sender.

9. A system for providing an item redirection service, comprising:
   a delivery system configured to deliver items addressed to recipients;
   a first address plant contained within the delivery system;
   an alternate address plant contained within the delivery system; and
   a computing subsystem associated with the first address plant and configured to:
      receive, at a database system, registration information for registering one or more recipients for the item redirection service, including delivery schedules associated with the recipients and specifying one or more periods during which the recipients desire to redirect items addressed to the recipients to alternate addresses associated with the recipients;
      receive an item addressed to a recipient at a first address;
      determine whether the recipient is registered for the item redirection service; and
      when it is determined that the recipient is registered for the item redirection service:
         hold the item at the first address plant without delivering the item to the recipient at the first address;
         determine, based on a delivery schedule associated with the recipient, whether a present time corresponds to a period during which the recipient desires to redirect items to an alternate address associated with the recipient; and
         when it is determined that the present time corresponds to a period during which the recipient desires to redirect items to the alternate address:
            readdress the held item to the recipient at the alternate address; and
            send the readdressed item to the recipient at the alternate address via the alternate address plant
   wherein the items are physical mail pieces, and the first address and the alternate address are physical addresses.

10. The system of claim 9, further comprising a component for receiving payment from the recipient when the item is sent to the recipient at the alternate address by at least one of the following: billing the recipient, debiting recipient's checking account, and debiting recipient's credit card account.

11. The system of claim 9, further comprising an input terminal for receiving the registration information for the item redirection service.

12. The system of claim 9, wherein the recipients register for the item redirection service with a delivery system operator, the registration performed using at least one of the following media: regular mail, e-mail, facsimile, internet, and an interactive voice response system.

13. The system of claim 9, wherein readdressing the item includes placing tracking indicia on a package containing the item.

14. The system of claim 9, wherein the item is sent to the recipient at the alternate address via a priority mail service.

15. The system of claim 9, wherein the physical mail pieces include address labels.

16. The system of claim 9, wherein the specified one or more periods and the alternate address are designated by the recipient when the recipient registers for the item redirection service.

17. The system of claim 9, wherein the item is placed in the delivery system by a sender.

18. A method for providing an item redirection service, comprising the stages of:
   receiving registration information for registering one or more recipients for the item redirection service via at least one of e-mail, facsimile, internet, and an interactive voice response system, the registration information comprising delivery schedules associated with the recipients specifying one or more periods during which the recipients desire to redirect items addressed to the recipients to alternate addresses associated with the recipients;
   receiving an item addressed to the recipient at a first address plant within the delivery system;
   determining, by a computing system, whether the recipient is registered for the item redirection service; and
   when it is determined that the recipient is registered for the item redirection service:
      holding the item at the first address plant;
      determining, by the computing system and based on a delivery schedule associated with the recipient, whether a present time corresponds to a period during which the recipient desires to redirect items to an alternate address associated with the recipient; and
      when it is determined that the present time corresponds to a period during which the recipient desires to redirect items to the alternate address:
         readdressing the held item to the recipient at the alternate address; and
         sending the readdressed item via a delivery service to the alternate address; and
   receiving payment from the recipient for the item redirection service by at least one of the following: billing the recipient, debiting the recipient's checking account, and debiting the recipient's credit card account;
   wherein the items are physical mail pieces, and the addresses are physical addresses.

19. The method of claim 1, further comprising sending the item to the recipient at the first address when it is determined that the present time does not correspond to a period during which the recipient desires to redirect items to the alternate address.

20. The system of claim 9, wherein the computing subsystem is further configured to send the item to the recipient at the first address when it is determined that the present time does not correspond to a period during which the recipient desires to redirect items to the alternate address.

21. The method of claim 18, further comprising sending the item to the recipient at the first address when it is determined that the present time does not correspond to a period during which the recipient desires to redirect items to the alternate address.

* * * * *

UNITED STATES PATENT AND TRADEMARK OFFICE
CERTIFICATE OF CORRECTION

| | |
|---|---|
| PATENT NO. | : 8,036,993 B2 |
| APPLICATION NO. | : 10/363535 |
| DATED | : October 11, 2011 |
| INVENTOR(S) | : Jacquelynn Estes |

It is certified that error appears in the above-identified patent and that said Letters Patent is hereby corrected as shown below:

Claim 3, col. 6, line 61, "the is registration" should read -- the registration --.

Signed and Sealed this
Sixth Day of March, 2012

David J. Kappos
*Director of the United States Patent and Trademark Office*